Feb. 23, 1965  J. N. McELROY  3,170,553
AIRCRAFT CONVEYOR SYSTEM
Filed Jan. 28, 1963  3 Sheets-Sheet 1

INVENTOR.
JAMES N. McELROY.
BY
Willard S. Grund
ATTORNEY.

INVENTOR.
JAMES N. McELROY.
BY
Willard S. Grove
ATTORNEY.

Feb. 23, 1965   J. N. McELROY   3,170,553
AIRCRAFT CONVEYOR SYSTEM
Filed Jan. 28, 1963   3 Sheets-Sheet 3
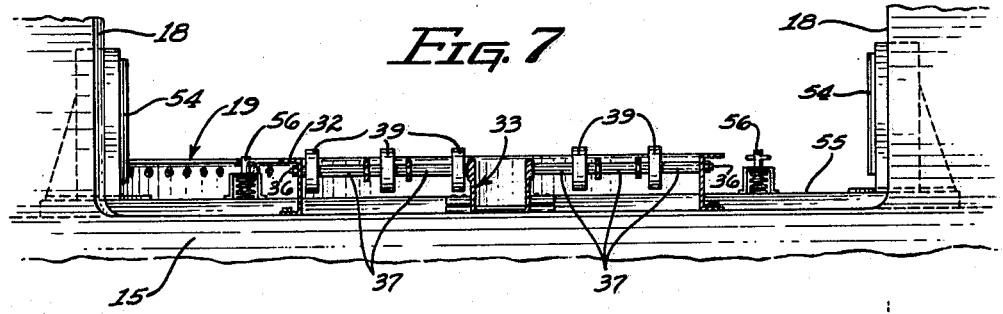
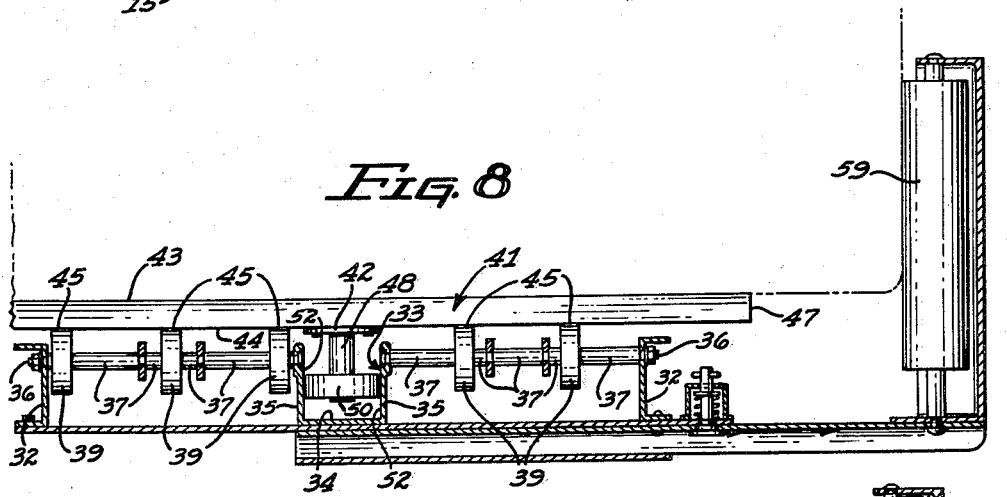
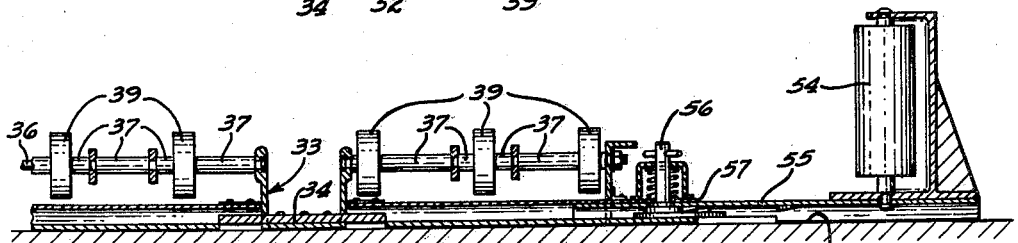
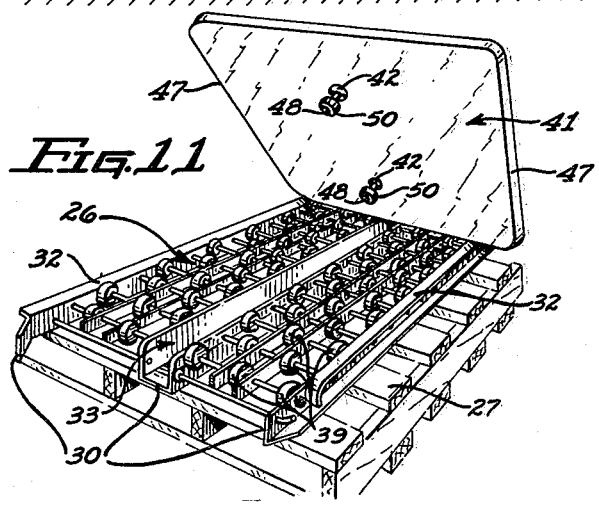
INVENTOR.
JAMES N. McELROY.
BY
William S. Grove
ATTORNEY.

United States Patent Office 3,170,553
Patented Feb. 23, 1965

3,170,553
AIRCRAFT CONVEYOR SYSTEM
James N. McElroy, Phoenix, Ariz., assignor to Intermountain Aviation, Inc., Phoenix, Ariz., a corporation of Arizona
Filed Jan. 28, 1963, Ser. No. 254,311
1 Claim. (Cl. 193—35)

This invention pertains to conveyor systems for aircraft and is particularly directed to a roller conveyor system for aerial delivery of cargo from the side door of such aircraft.

One of the objects of this invention is to provide a conveyor system for loading and aerial delivery of cargo for aircraft which is simple in construction, and light in weight with high load carrying capacity.

Another object of this invention is to provide a roller conveyor system for aerial delivery of cargo from the side door of an aircraft which utilizes specially constructed cargo carrying pallets which are dropped along with the cargo and are readily adapted for reuse after the cargo has been received on the ground.

A further object of this invention is to provide a conveyor system for aerial delivery of cargo requiring a minimum of effort in moving the cargo into or out of the fuselage of the airplane and in which an ordinary fork lift tractor unit can readily be utilized to pick the cargo up from the ground surface and present it to the conveyor track system in the aircraft with no manual lifting or skidding of the cargo being required.

And a still further object is to provide a roller conveyor system for aerial delivery of cargo from the side door of the aircraft in which the cargo can be moved quickly, easily and freely from any position in the fuselage to the discharge door so as to facilitate accurate drop of the cargo in a desired designated area on the ground.

Further features and advantages of this invention will appear from a detailed description of the drawings in which:

FIG. 7 is an enlarged sectional view on the line 7—7 of FIG. 5.

FIG. 8 is an enlarged sectional view on the line 8—8 of FIG. 5.

FIG. 9 is an enlarged fragmentary sectional view on the line 9—9 of FIG. 5.

FIG. 11 is a perspective view of the underside of one of the cargo carrying pallets associated with a roller loading conveyor section.

Figure 1:
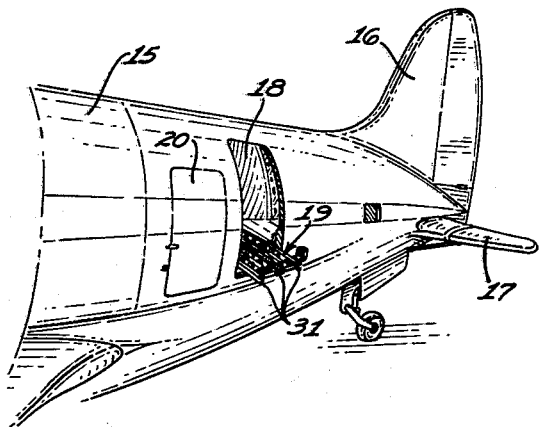
FIG. 1 is a fragmentary perspective view of the rear portion of an aircraft showing the cargo door opening and discharge and loading end of the roller conveyor system for aerial delivery of cargo incorporating the features of this invention.

As an example of one embodiment of this invention there is shown in FIG. 1 the rear portion of an aircraft comprising the fuselage 15, the tail fin 16, the horizontal stabilizer 17, and the cargo door opening 18 from which projects the loading and discharge portion 19 of the conveyor track of this invention.

Figure 3:
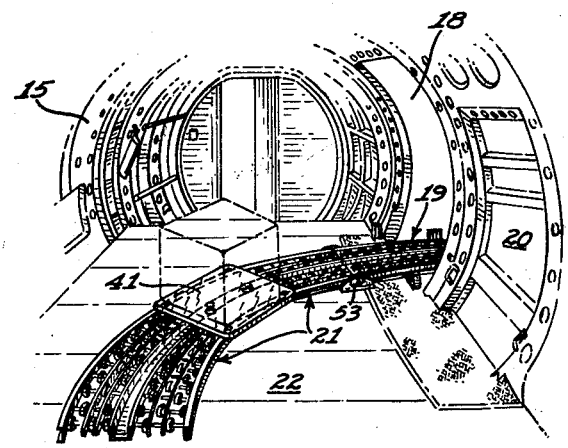
FIG. 3 is a perspective view of the rearward portion and discharge end of the conveyor system in the fuselage of the aircraft shown in FIG. 1.

FIG. 3 is a view showing the interior of the fuselage 15 at the cargo door opening 18 and the passenger door 20 wherein the loading and discharge track portion 19 connects with the curved track portion 21 securely fastened to the floor 22 of the fuselage 15.

Figure 2:
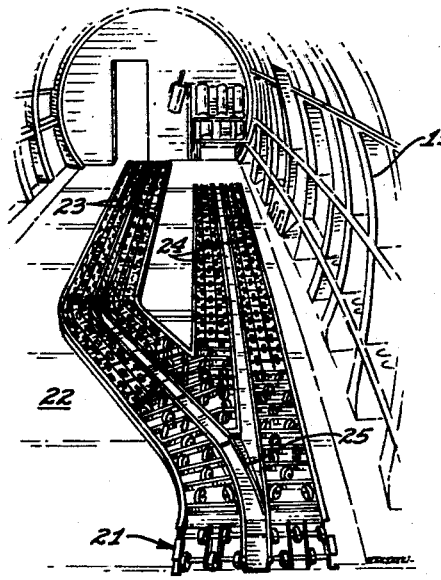
FIG. 2 is a perspective view of the forward portion of the conveyor system in the fuselage of the aircraft shown in FIG. 1.
Figure 4:
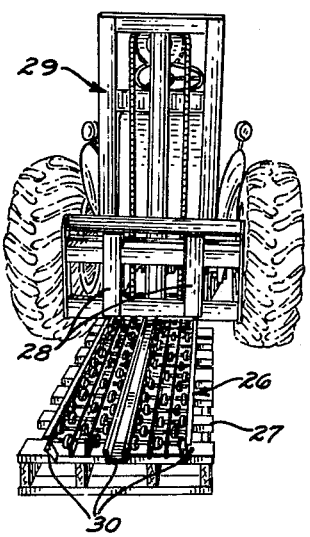
FIG. 4 is a perspective view of the roller loading conveyor section which is utilized in conjunction with a pallet and fork lift tractor for loading cargo on the conveyor system.
Figure 5:
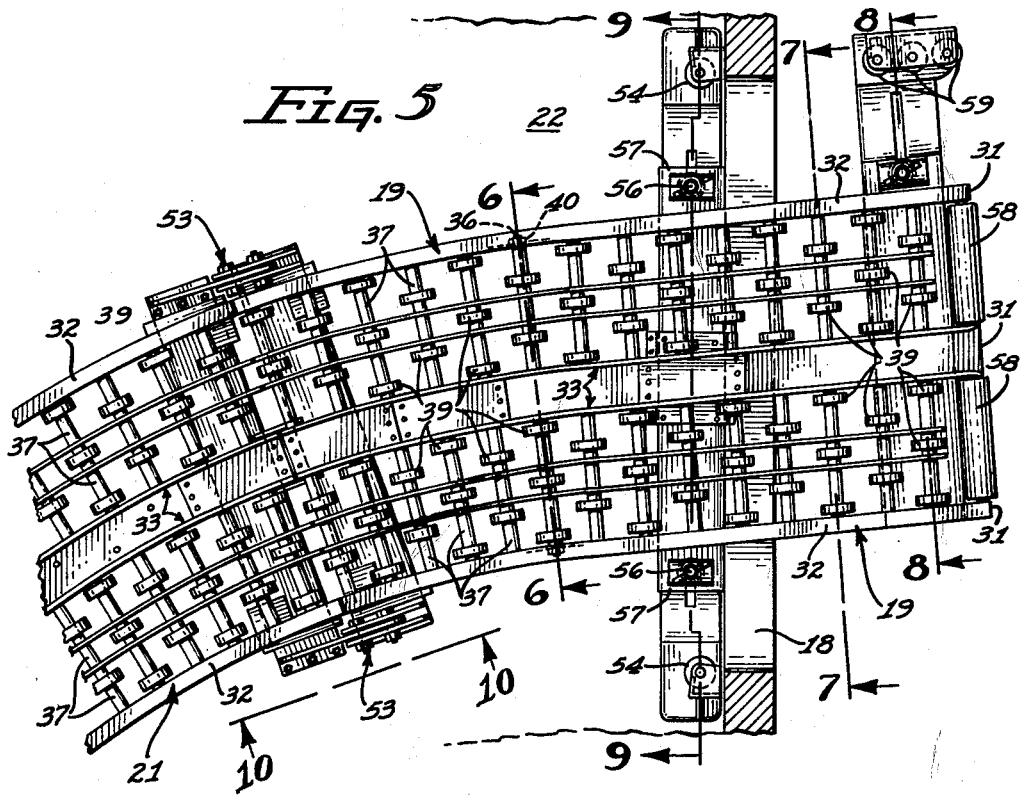
FIG. 5 is a fragmentary enlarged plan view of the loading and discharge end of the conveyor system.

FIG. 2 is a forward interior view of the fuselage showing the conveyor track system connected to the forward end of the curved track portion 21 comprising the cargo stowage tracks 23 and 24 fixed to the floor 22 and selectively connectable to the curved track portion by a switch 25. In FIG. 4 is shown a short section of conveyor track 26 which is mounted on a suitable pallet 27 adapted to be carried on the fork 28 of a fork lift tractor 29 which track section 26 can be thus raised and lowered and aligned with its forward end 30 engaging the outer end 31 of the loading and discharge track portion 19 for loading or unloading cargo.

Figure 6:
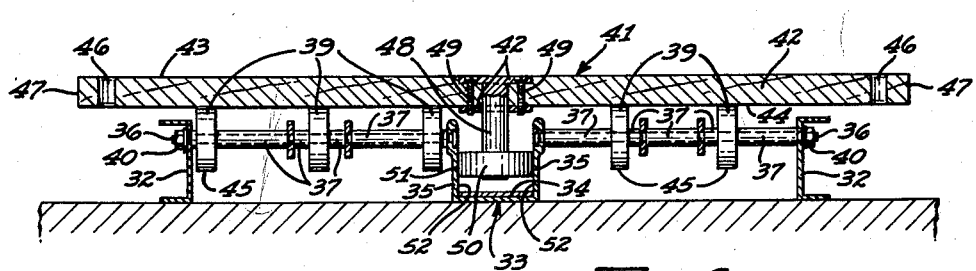
FIG. 6 is an enlarged sectional view on the line 6—6 of FIG. 5.
Figure 10:
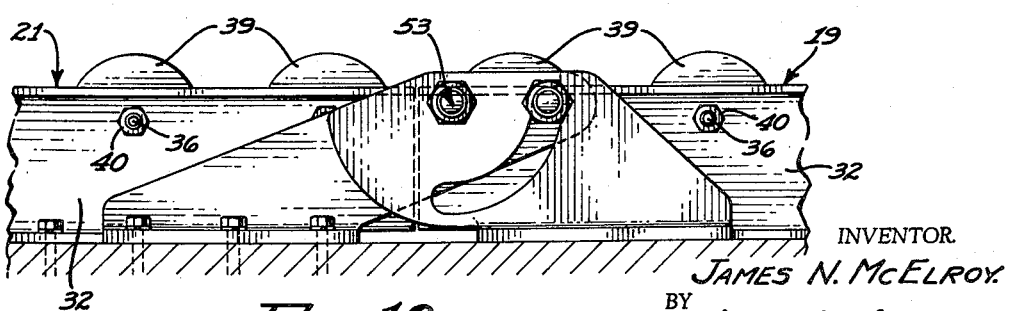
FIG. 10 is an enlarged fragmentary elevational view on the line 10—10 of FIG. 5.

Referring to FIG. 6, the conveyor track structure above described is of unique construction and arrangement comprising the laterally spaced side channel members 32 and the intermediate U-shaped guide channel member 33 having the bottom 34 and the upstanding guide members 35. The guide members 35 are connected by laterally extending bolts 36 which pass through spacer sleeves 37, spacer strips 38, and the inner races of ball bearing load supporting rollers 39 and are locked in position by suitable nuts 40. The side channel members and the U-shaped guide channel 33 are securely bolted to the floor of the aircraft.

The cargo carrying pallets 41 consist of a flat plate 42 having a top surface 43 adapted to engage and support the cargo load, and a bottom surface 44 adapted to be supported and roll on the peripheries 45 of the rollers 39. Suitable cargo tie-down holes 46 may be formed in the laterally extending side portions 47. Intermediate the side portions 47 of the pallet 41 are fixed a pair of vertically disposed longitudinally spaced guide roller studs 48 secured in the plates 42 by suitable bolts 49 and extending downwardly below the bottom surface 44 into the U-shaped guide channel 33. Ball bearing guide rollers 50, having their peripheries 51 nicely fitting between the inner surfaces 52 of the upstanding guide members 35 of the guide channel 33, have their inner races fixed to the guide roller studs 48. By this arrangement the plate 42 is accurately guided in load carrying position on the rollers 39 as the pallet travels along the roller conveyor track portions 23, 24, 25, 21 and 19. It will be further noted that the pallet, either empty or loaded, may readily be lifted for a discharge from the end 31 of the track 19 as required, FIG. 11.

Preferably, the loading and discharge portion 19 of the conveyor track is hinged at 53 to swing upwardly and inwardly of the fuselage 15 out of the cargo door opening 18 so that the opening may be closed by a suitable closure door as desired. Further, guide rollers 54 provided on a suitable bracket 55 fixed to the floor 22 of the aircraft are adapted to protect and facilitate passage of the cargo out through the cargo door opening, especially during air drops. Suitable releasable wing bolts 56 are provided in the bracket 55 adapted to engage the clips 57 fixed to the track portion 19 to lock that section 19 in loading and discharge position in the cargo door 18. Additional rollers 58 and 59 at the outer end 31 of the track portion may be utilized to facilitate air drop and the free release of the pallet and attached cargo from the track 19 without hazard or damage to the aircraft or cargo.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appended claim are intended to be included herein.

Having thus fully set forth and described this invention what is claimed and desired to be obtained by United States Letters Patent is:

An aircraft conveyor track system comprising in combination:
- (a) a pair of laterally spaced side channel members,
- (b) an intermediate U-shaped guide channel member located between said side channel members,
- (c) horizontally transversely journaled load carrying rollers mounted on said side channels and said guide channel located each side of said guide channel and between said side channels,
- (d) a cargo carrying pallet operative longitudinally on said conveyor track comprising,
- (e) a flat cargo carrying plate transportably supported by its bottom surface on said load carrying rollers,
- (f) and a pair of longitudinally spaced guide rollers journaled on the bottom of said flat plate one adjacent each end thereof and engaging within said U-shaped guide channel member so as to provide the sole means to laterally retain said cargo carrying plate of said pallet in load carrying contact with said track rollers as said pallet moves along said track.

References Cited by the Examiner
UNITED STATES PATENTS

| | | | |
|---|---|---|---|
| 363,914 | 5/97 | Rogers | 193—35 |
| 1,634,341 | 7/27 | Romine | 104—242 |
| 2,949,863 | 8/60 | Cozzoli | 193—35 |

SAMUEL F. COLEMAN, *Primary Examiner.*

ANDRES H. NIELSEN, *Examiner.*